(12) United States Patent
Bryman

(10) Patent No.: US 6,906,329 B2
(45) Date of Patent: *Jun. 14, 2005

(54) HIGH RESOLUTION-3-D POSITION SENSITIVE DETECTOR FOR GAMMA RAYS

(75) Inventor: Douglas Bryman, Vancouver (CA)

(73) Assignee: Triumf, Vancouver (CA)

( * ) Notice: Subject to any disclaimer, the term of this patent is extended or adjusted under 35 U.S.C. 154(b) by 46 days.

This patent is subject to a terminal disclaimer.

(21) Appl. No.: 10/706,983

(22) Filed: Nov. 14, 2003

(65) Prior Publication Data

US 2005/0072932 A1 Apr. 7, 2005

Related U.S. Application Data

(63) Continuation of application No. 10/192,614, filed on Jul. 11, 2002.

(51) Int. Cl.[7] .................................................. G01T 1/20
(52) U.S. Cl. ................... 250/366; 250/370.11; 250/389
(58) Field of Search ............................... 250/366, 369, 250/370.11, 361, 389

(56) References Cited

U.S. PATENT DOCUMENTS

| | | |
|---|---|---|
| 3,898,465 A | 8/1975 | Zaklad et al. |
| 4,262,202 A | 4/1981 | Cusano et al. |
| 4,880,983 A | 11/1989 | Markey |
| 5,349,191 A | 9/1994 | Rogers |
| 5,665,971 A | 9/1997 | Chen et al. |
| 6,100,532 A | 8/2000 | Bryman |
| 6,124,585 A | 9/2000 | Enghdal et al. |
| 6,459,085 B1 | 10/2002 | Chang et al. |
| 6,486,468 B1 | 11/2002 | Lacy |
| 6,521,894 B1 | 2/2003 | Iwanczyk et al. |
| 2002/0074505 A1 | 6/2002 | Francke et al. |
| 2004/0007670 A1 * | 1/2004 | Bryman ............... 250/366 |

OTHER PUBLICATIONS

K. Masuda et al, "A Liquid Xenon Position Sensitive Gamma–Ray Detector for Positron Annihilation Experiments," Nuclear Instruments and Methods 188 (1981) pp. 629–638, North–Holland Publishing Company.

K. Masuda et al., "Test of a Dual–Type Gridded Ionization Chamber Using Liquid Xenon," Nuclear Instruments and Methods 174 (1980) pp. 439–446, North–Holland Publishing Company.

(Continued)

Primary Examiner—Albert Gagliardi
(74) Attorney, Agent, or Firm—Harness, Dickey & Pierce, P.L.C.

(57) ABSTRACT

A method and apparatus for determining the position of a gamma ray interaction are disclosed. A medium that emits light in response to an interaction between a gamma ray and the medium is provided. A plurality of photodetectors is used to detect the light and determine a first three-dimensional position of the interaction. A field is produced in the medium that directs ionization electrons resulting from the interaction to a collector. A portion of a shutter system that corresponds to the interaction is opened. The shutter selectively blocks and permits the passage of the ionization electrons to the collector. A second three-dimensional position of the interaction is determined by localizing a two-dimensional position of the interaction in the collector and determining a third dimension based on a time of arrival of the ionization electrons relative to when the light is detected.

45 Claims, 3 Drawing Sheets

OTHER PUBLICATIONS

E. Aprile et al., "The Liquid Xenon Gamma–Ray Imaging Telescope (LXeGRIT) for Medium Energy Astrophysics," Proceedings–SPIE The International Society for Optical Engineering, vol. 2806, pp. 337–348.

M. Lopes et al., "Positron Emission Tomography Instrumentation: Development of a Detector Based on Liquid Xenon," LIP–Coimbra, Department of Physics of the University of Coimbra, Portugal, pp. 675–680.

Hirata et al., "Experimental Study of the Atmospheric Neutrino Flux," Physics Letters B (Apr. 28, 1988), vol. 205, No. 2–3, pp. 416–420.

Barkov et al., "Search for $\mu^+ \rightarrow e^+ \gamma$ down to $10^{-14}$ branching ratio," Research Proposal to Paul Scherrer Institut, May 1999, pp. 1–61.

A. Aguilar et al., (LSND Collaboration) "Evidence for neutrino oscillations from the observation of . . . ," Phys. Rev. D, vol. 64 (11) : 112007 (2001).

Bryman et al., "Gated Grid System Used With A Time Projection Chamber," Nuclear Instruments and Methods in Phys. Res. A234 (1985) pp. 42–46.

C. Athanassopoulos et al., "The liquid scintillator neutrino detector and LAMPF neutrino source," Nuclear Instruments and Methods in Physics Research Section A, vol. 388, No. 1/2, (1997) pp. 149–172.

C. Hargrove, "The Spatial Resolution of the Time Projection Chamber at Triumf," Nuclear Instruments and Methods 219 (1984) 461.

* cited by examiner

HIGH RESOLUTION-3-D POSITION SENSITIVE DETECTOR FOR GAMMA RAYS

RELATED APPLICATIONS

The present application is a continuation of application Ser. No. 10/192,614, entitled "HIGH RESOLUTION 3-D POSITION SENSITIVE DETECTOR FOR GAMMA RAYS" filed Jul. 11, 2002, the entire contents of which are hereby incorporated herein by reference.

BACKGROUND OF THE INVENTION

1. Field of the Invention

The invention generally relates to gamma ray detectors. More particularly, the invention relates to a gamma ray detector for determining the positions of gamma ray interactions for producing an image of a scanned object.

2. Background

Gamma ray detectors are used in a wide variety of apparatus, such as in positron emission tomography (PET), single photon emission-computed tomography (SPECT), contraband explosive detectors, and the like. All of such apparatus depend upon detectors that can determine the position of interactions of gamma rays with the detectors, such that with a plurality of such position measurements, a scan of an object of interest can be made. These techniques are well known in the art and need not be detailed herein.

A difficulty encountered with these detectors is that in order to perform a scan, a multiplicity of such detectors are necessary, and the positions of interactions of gamma rays with the detectors must be determined so that with a plurality of such determinations (e.g., in the millions) sufficient data is obtained to produce an accurate scan image of the object of interest. Since each detector must be capable of generating position data for a gamma ray interaction, acquisition of such position data and the compilation thereof (e.g., by a computer) requires very substantial and expensive apparatus. Typically, the data of such detectors is initiated by an interaction of a gamma ray with a scintillator material of the detector that generates a light. By determining the detector in which such light was emitted, and the position of that emitted light within the detector, a data point for a scan is produced. By providing a multiplicity of such detectors, a multiplicity of data points can be acquired. A computer can then resolve the data into an image of the object of interest being scanned.

The usual detector for such gamma ray scanning devices is an inorganic scintillating crystalline material (e.g., cerium doped lutetium oxyorthosilicate (LSO) and bismuth germinate (BGO)) which is, in and of itself, expensive. The crystalline material is a scintillator material, which will emit light, and therefore the position of interaction of a gamma ray can be determined. The X-Y position resolution of such detectors is typically 20 square millimeters and typically is not uniform for all positions, and this leaves a basic Inaccuracy in not knowing precisely where in the detector (i.e., in the X and Y coordinates) that interaction occurred. In addition, the depth of the interaction (i.e., the Z coordinate) is generally not determined, or is poorly determined, resulting in a so-called parallax error and further image inaccuracy. Those effects result in less than desirable accuracy of scan images for the object of interest.

A modular light signal triggerable detector is disclosed in Bryman, Douglas, U.S. Pat. No. 6,100,532, Detector for Gamma Rays (Aug. 8, 2000) which is hereby incorporated by reference in its entirety. This patent discloses a gamma ray detector for determining the position of gamma ray interactions. The detector has at least one module, and each module has a converter for converting gamma rays into charged particles. A scintillator is provided for emitting light in response to the charged particles produced by the converter. A photodetector determines when light has been emitted from the scintillator. A two-coordinate position detector is provided for determining the X, Y and Z coordinates of charged particles interacting with the position detector. A controller and signal device is provided for signaling the presence of emitted light in the photodetectors and for activating the position detector. This system addresses some of the above-noted deficiencies and provides a gamma ray detector which can be inexpensively constructed, requires far less monitoring instrumentation for acquisition of the required data, and which can determine the X, Y and Z coordinates of the gamma ray interaction.

The conversion of gamma rays in material (including heavy liquids like xenon (Xe), krypton (Kr), and the like) and the production of scintillation light and charged products (electrons and positrons) are well studied and understood by those skilled in the art. Further, software tools are available that simulate the interactions of gamma rays and charged particles with the matter. Position sensitive detectors for charged particles, such as noble liquid ionization chambers, time-projection-chambers (TPC), and light detection arrays are commonly used instruments which are known to have position and energy resolution capability similar to those obtained in the present application.

Liquid Xe position sensitive ionization detectors with grids such as described by K. Masuda et al., *A Liquid Xenon Position Sensitive Gamma-Ray Detector for Positron Annihilation Experiments*, Nucl. Instr. Meth. 188 (1981) 629–638; and K. Masuda, et al., *Test of a Dual-Type Gridded Ionization Chamber Using Liquid Zenon*, Nucl. Instr. Meth. 174 (1980) 439–446, each of which is hereby incorporated by reference in its entirety, are known to be able to provide sub-millimeter position resolution for low energy gamma rays. A gated time projection ionization chamber has been reported in the articles describing the TRIUMF TPC (gas drift device). The Columbia University liquid Xe TPC (E. Aprile, et al., *The Liquid Xenon Gamma-Ray Imaging Telescope* (LXeGRIT) for Medium Energy Astrophysics, Proceedings-SPIE The International Society For Optical Engineering, SPIE Vol. 2806, pgs. 337–348, which is hereby incorporated by reference in its entirety, is an example of a liquid Xe ionization TPC that achieved 1 mm position resolution and energy resolution of 5.9% at 1 MeV gamma ray energy. Additionally, Lopes et al. have constructed a liquid Xe ionization detector with transaxial position resolution of 1mm, depth of interaction resolution of 5 mm, coincidence time resolution of 1.3 ns, energy resolution at 511 keV of 17% and efficiency of 60% (see, M. Lopes, et al., *Positron Emisson Tomography Instrumentation: Development of a Detector Based on Liquid Xenon*, Proc. Calorimetry in High Energy Physics, pages 675–680 (1999)), which is hereby incorporated by reference in its entirety.

These and numerous other articles present example solutions for instrumentation of the ionization signal collection using pads and wires, gating grids and scintillator triggers that are applied to the problem of measuring charged particle trajectories. In these instruments the scintillation light has been used primarily as a fast indicator that a suitable event has occurred without specifically localizing the point of interaction.

In the KAMIOKANDE (as described in K.S. Hirata et al., *Experimental Study of the Atmospheric Neutrino Flux*, PHYSICS LETTERS B, Vol. 205, number 2,3, p. 416–420 (1988)) and other detectors, arrays of photodetectors covering the surface of light-emitting liquids and solids have been used to localize the position of interactions of gamma rays and charged particles. In L. Barkov et al., Search for $\mu^+ \to e^+\gamma$ down to $10^{-14}$ branching ratio, Paul Scherer Institute proposal R-99-05.1 (1999), which is hereby incorporated by reference in its entirety) to study lepton-flavor-violating decay $\mu^+ \to e^+\gamma$, a liquid Xe scintillation detector using an array of photo-multiplier tubes surrounding a small volume has been demonstrated to give 0.8 cm full width half maximum (fwhm) position resolution for 1 MeV gamma rays.

SUMMARY OF THE INVENTION

The present invention advantageously combines several of the above-described individual elements in detector modules. The arrangement of these elements into a specific module and array provides a unique solution for the detection of low energy gamma rays.

Accordingly, it is an object of the present invention to provide an improvement of gamma ray detector modules. The foregoing and other objects are achieved by a method for determining the position of a gamma ray interaction, the method comprising: emitting light in a medium in response to an interaction between a gamma ray and the medium; determining when light has been emitted from the medium and a three-dimensional position of the interaction using a plurality of photodetectors; producing a drift field in the medium that directs ionization electrons resulting from the interaction to a collector; and determining a precise three-dimensional position of the interaction by localizing the position of the interaction in two dimensions in the collector based on the position of the ionization electrons in the collector and determining a third dimension based on a time of arrival of the ionization electrons relative to when the light is detected.

Further the present invention provides for a gamma ray detector for determining the position of gamma ray interaction, the detector comprising: an active region containing a medium for emitting light and ionization electrons in response to an interaction between a gamma ray and the medium; a plurality of photodetectors to determine when light has been emitted from the medium and a three-dimensional position of the interaction; a collector that is used to determine a precise three-dimensional position of the interaction by localizing the position of the interaction in two dimensions in the collector based on the position of the ionization electrons in the collector and a third dimension based on a time of arrival of the ionization electrons relative to when the light is detected; and a plurality of field wires to produce a drift field in the medium that directs the ionization electrons resulting from the interaction to the collector.

Further scope of the applicability of the present invention will become apparent from the detailed description provided hereinafter. However, it should be understood that the detailed description and specific embodiments, while disclosing the preferred embodiments of the invention, are provided by way of illustration only inasmuch as various changes and modifications coming within the spirit and scope of the invention will become apparent to those skilled in the art from the detailed description which follows.

BRIEF DESCRIPTION OF THE DRAWINGS

The present invention will become more fully understood when the following detailed description is considered in conjunction with the accompanying drawings, which are provided by way of illustration only, and thus are not meant to limit the present invention, and wherein.

DETAILED DESCRIPTION OF PREFERRED EMBODIMENTS

Figure 1A:
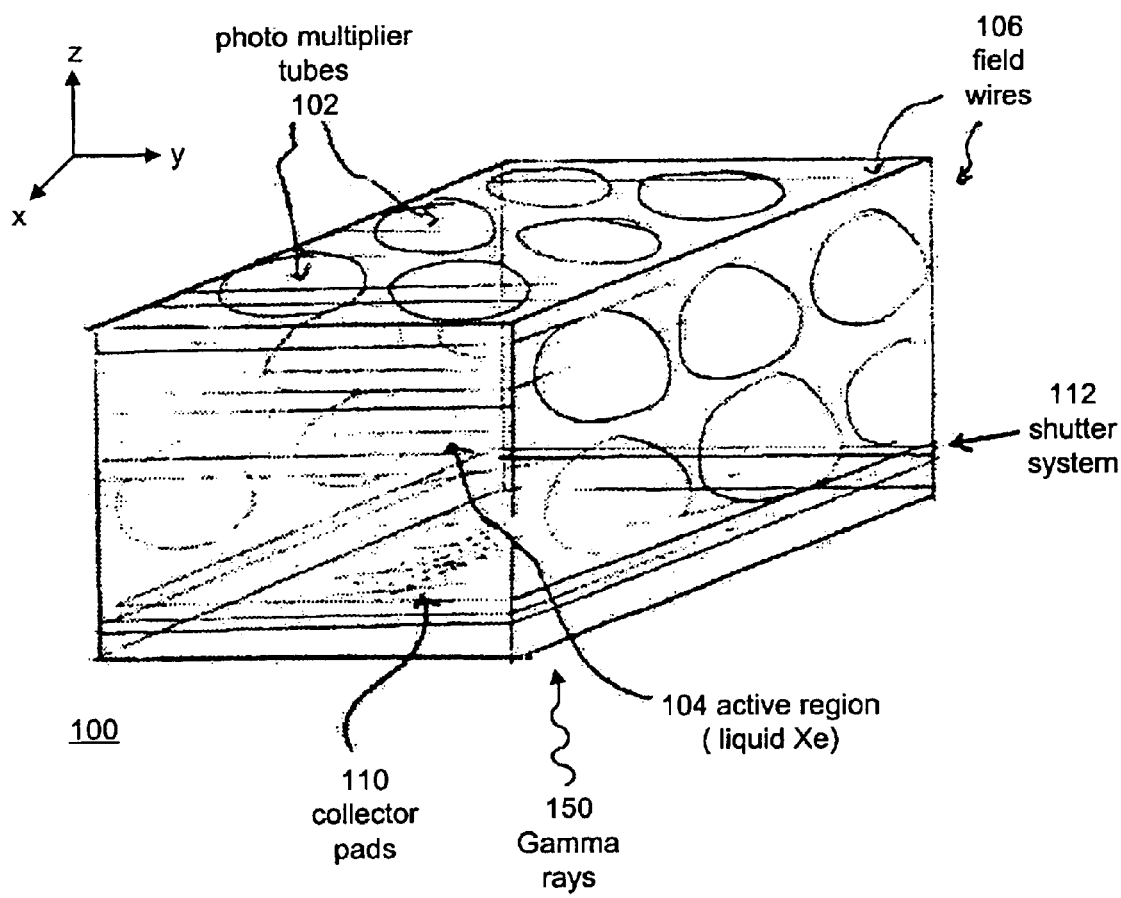
FIG. 1A is a perspective view of an embodiment of the present invention.

Aspects of the invention are disclosed in the following description. Those skilled in the art will appreciate that alternate embodiments can be devised without departing from the spirit or the scope of the invention.

The present invention advantageously uses aspects such as the light signal produced by the gamma ray in the detector module. The light signal generated from the gamma ray is readily selectable for sole read-out of a selectable region (in space and time) for the collection of the ionization signal (e.g. electrons) allowing a high degree of read-out channel commonality (i.e., multiplexing). Therefore, the present invention can achieve a large factor reduction of the number of readout channels required as well as increased rate capability due to the time selection, which determines when the ionization electrons will arrive at the collectors.

Additionally, the position resolution response of the detector according to the present invention is uniform and the three spatial coordinates of the gamma ray interaction are determined accurately and unambiguously. Further, modules can be produced to cover very large areas with high resolution, high detection efficiency, and modest cost.

Another aspect of the present invention permits the materials, dimensions and detector types used to be tailored for a large range of gamma ray energy and exposure applications. The high speed of the scintillation light signal in noble liquid materials and other materials and the fast position-sensitive trigger selectivity is suitable to high rate applications involving coincident signals occurring in other detector modules.

The above-mentioned aspects and other novel aspects of the present invention are further described below. Well known elements, devices and processes will not be described in detail in the following description as those skilled in the art will readily understand the invention without the distraction of a rendition of non-essential information.

A triggerable detector for measuring the energy, position of interaction in three dimensions, and the angle of emissions of low energy gamma rays is described herein. The detector comprises a triggerable Ionization chamber in which gamma rays produce ionization and the positions of the ionization, including multiple interactions, is measured in three dimensions. A shutter system comprising a set of grids or electronic shutters is provided to admit drifting ionization electrons during limited times and over a limited spatial extent. A triggering system based on scintillation light signals is also provided that localizes the positions and energy deposits of the ionization at the times of interaction for triggering the ionization detector and for measuring the total energy deposited by the gamma ray interaction.

The ionization detector material includes a liquid or gas such as Xenon, Krypton, or Argon, for example, in which detectable scintillation light Is produced promptly when Ionization occurs and in which ionization electrons drift under applied electric fields with little attenuation or disturbance to collection electrodes in a collector. A position-sensitive array of photodetectors views the entire ionization detector and feeds a triggering system for the ionization detector that selectively activates it in space and time and provides an additional measure of the energy of the interaction. Since all three dimensions of the interaction point are measured simultaneously with comparable resolution a precise position of the interaction is measured (e.g., approximately 1 mm or less in all three dimensions) and parallax errors are largely absent.

Gamma rays convert to charged particles (pair production or Compton scattering) in the detector medium/material and the interaction is detected first by the photodetectors. A triggering system (e.g., a logic array) selectively takes the pattern and signal size of the photodetectors fired, and opens only the shutter region in which the ionization occurred and only at the time expected for the ionization electrons to arrive. The two-dimensional collection electrode array accurately localizes the position of the ionization. The third dimension is determined by the precise time of arrival of the ionization relative to the scintillation signal time (i.e., when the light signal activates the photodetectors). The collected ionization signal determines the energy deposited by the gamma ray interaction. Additional information on the energy deposit is provided by the size of the collected light signal. The above-described procedure thereby activates only a small region of the collection electrode array for a limited period. Thus, only one set of readout elements is required to instrument the entire position sensitive array of the detector regardless of the size of the detector. Pile-up of other interaction signals is limited to the trigger selection region and the open timing period of the shutter. Therefore, high rates of interaction and coincidence of related signals in other detectors can be accommodated without degradation of performance.

In addition to detecting the position and energy of single interactions of gamma rays, multiple interaction events, such as contained Compton scatters, can be used to obtain the direction of individual gamma rays. In this mode, multiple coincident triggers will be used to activate more than one region of the detector so a complete history of the event can be recorded resulting in reconstruction of the angle of the gamma ray.

Figure 1B:
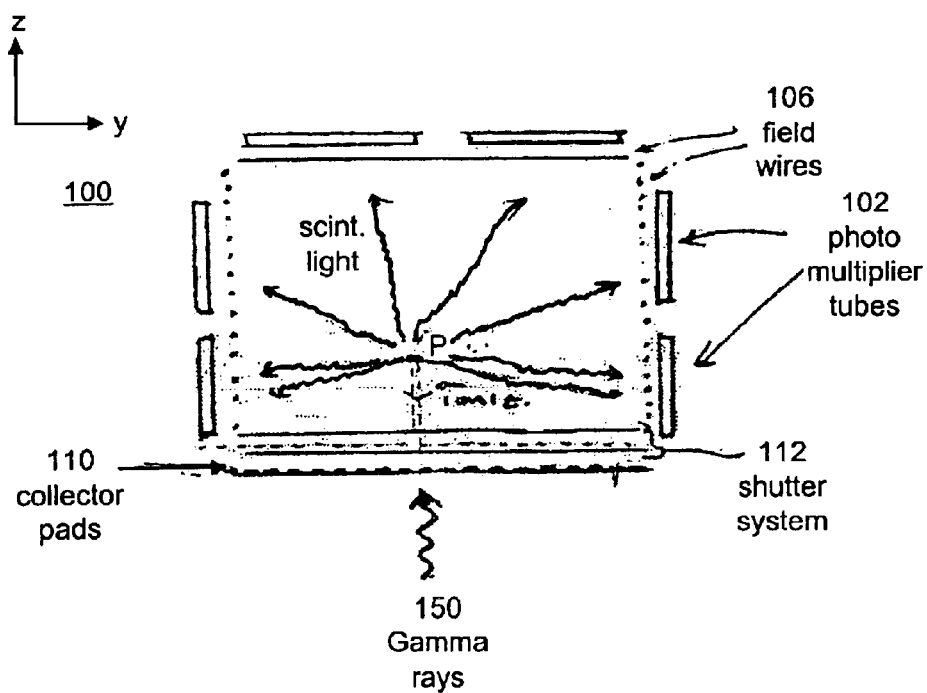
FIG. 1B is a cross-sectional view of an embodiment of the present invention.

FIGS. 1A and 1B illustrate a detector module 100 of a first embodiment of the present application. A time projection ionization chamber is shown that is gated (i.e., opening and closing of the shutters) by a position sensitive signal derived from an array of photodetectors 102. The gamma ray 150 converts in the active region 104 containing a medium (e.g., liquid xenon) that serves, in this preferred embodiment, as a fully active converter, optical transmission medium, and ionization drifting medium. Those skilled in the art will appreciate that the active region can contain other liquid or gas mediums that meet these requirements. Scintillation light from the interaction P is detected by the array of photodetectors 102 (e.g., photo-multiplier tubes) surrounding the ionization chamber on several surfaces. The photodetectors 102 measure the energy of the interaction P (for event selection) which is proportional to the light signal (i.e., emitted light). A rough three-dimensional position of the interaction P Is determined by the distribution of the light signals within the array with a precision of approximately 8 mm full width half maximum (fwhm) in each of three dimensions.

Alternatively, a difference of times at which the emitted light from the interaction P arrives at the plurality of photodetectors 102 (e.g., photodetectors on opposite surfaces and/or adjacent photodetectors) can be used to determine the three-dimensional position of the interaction P. The difference between the times of arrival of the light at the plurality of photodetectors 102 can be used to obtain the three-dimensional position of the interaction P with comparable precision to that found from the distribution of the light itself. For example, since light travels at a relatively slow speed of $1.9 \times 10^{10}$ cm/s in liquid Xe, a reasonable timing resolution of 0.1 ns could give a position resolution of 2 cm that is comparable to the light distribution system. Further, those skilled in the art will appreciate that a combination of the two methods can be used. Therefore, a distribution of the emitted light detected by the plurality of photodetectors 102 and a difference of times at which the emitted light arrives at the plurality of photodetectors 102 can be used to determine the rough three-dimensional position of the interaction P. An example of a system using both time of arrival and energy requirements in a large scintillator detector is provided by A. Aguilar; LSND Collaboration, *Evidence for neutrino oscillations from the observation of . . .* ," Phys. Rev. D, Vol. 64(11): 112007, (2001) which is hereby incorporated by reference in its entirety.

In addition to producing scintillation light (i.e., emitted light), the electron positron pair (or Compton electron) produced in the conversion of the gamma ray 150, ionizes the medium producing free ionization electrons which drift under an applied electric field towards the collector 110 (e.g., collector pads/collection array) of the ionization chamber. The drift field is provided by a set of drift field wires 106 that are arranged to minimally obscure the light signal. For example, a drift field in liquid xenon of 1 kV/cm will cause the ionization electrons to drift at a speed of 0.2 cm/s so that for a 10 cm drift the maximum "memory" time of the chamber would be 50 $\mu$s. Since the drift field can affect the scintillation light output, the optimum drift field may be determined to suit a particular application. Therefore, those skilled in the art will appreciate that the previous example is for purposes of illustration and not limitation. Accordingly, other combinations of drift field intensity, medium used, and size of the chamber can alter the above-described memory time as required.

Before reaching the collector 110, the ionization electrons pass through a shutter system 112 (e.g., two orthogonal arrays of gating wires), which is usually biased to block the passage of the ionization electrons to the collector 110. When a gamma ray 150 interacts with the medium and emits light, the photodetectors 102 fire and a triggering system localizes the position of the interaction P. The associated shutter region in the shutter system 112 centered on the scintillation light localizes the interaction point in the two dimensions transverse to the gamma direction (e.g., x and y). This region is switched to be transmitting (i.e., permitting the passage of the electrons) for a predetermined time interval. The time interval is dependent on the localization of the coordinate along the gamma ray 150 direction (e.g., the z direction). In this way, the shutters of the shutter system 112 in the desired region is open for a limited period (e.g. for approximately 5 $\mu$s for the drift velocity above and assuming a z position localization interval of 1 cm), thus limiting the possibility of accidental pile-up of unwanted signals.

The collector 110 (e.g., collection electrode array/ collector pads) is used to determine both coordinates of the gamma interaction P transverse to the gamma direction. This collector 110 may include an array of collector pads of a size consistent with the desired position resolution in which the ionization is directly detected. Each pad can be connected to an amplifier (not shown) and an electronic circuit that continuously samples the energy collected, as is well known in the art. For example, pads of dimension 1 mm×1 mm would give position resolution of <1 mm (fwhm) using single pad or multiple pad events in which the ionization is detected by more than one pad.

Alternately, the x and y positions can be determined by a charge induced on an array of orthogonal wires placed between the shutter grid and the collector 110. Wires spaced at 3 mm, for example, in which the induced signal is spread over several wires would be expected to yield a position resolution of <1 mm using interpolation of the signal sizes to determine the centroid, as is well known in the art. Further, those skilled in the art will appreciate that other similar techniques are in common usage and may be applied.

The time of arrival of the signal at the collector 110 or signal wires relative to the trigger time gives the vertical position (z) or the depth of the interaction of the gamma ray, since the drift velocity is constant and known. As previously discussed, the drift velocity can be determined as required for the specific medium and size of the module and is controlled by the drift field wires 106.

The collector 110 (e.g., collector pads or signal wires) can be instrumented in several modes depending on performance and cost requirements. For example, in a first mode, analog pulse height information can be obtained using analog-to-digital converters (ADCs). In another mode, the pattern of hits above a set threshold can be obtained using discriminators to provide the "address" of the elements fired. Still Another approach to instrumentation is to use flash ADCs, charged-coupled-devices (CCDs) or switched capacitor arrays to readout the signals in discrete time segments. This simultaneously provides all three coordinates by readout of the individual signals.

Since the shutters open selectively only for the rough position and time of arrival of the ionization, essentially activating only a small segment of the detector for any individual event, the numbers of channels of electronics instrumentation required for the ionization signal elements can be drastically reduced. For instance, in the case of pad collectors mentioned above, there would be 100 pads/cm$^2$, requiring about 10$^5$ pads for a detector subtending a 30 cm×30 cm area. However, the scintillation light localization within an x-y region of, for example, 2 cm×2 cm, would allow the entire detector to operate with as few as 400 electronics channels. In this example, there would be one common set of electronics for every 20$^{th}$ collection pad in the x and y directions. Since, within the resolution of the triggering system, only one of these would normally have a signal, there would be little interference.

Figure 2:
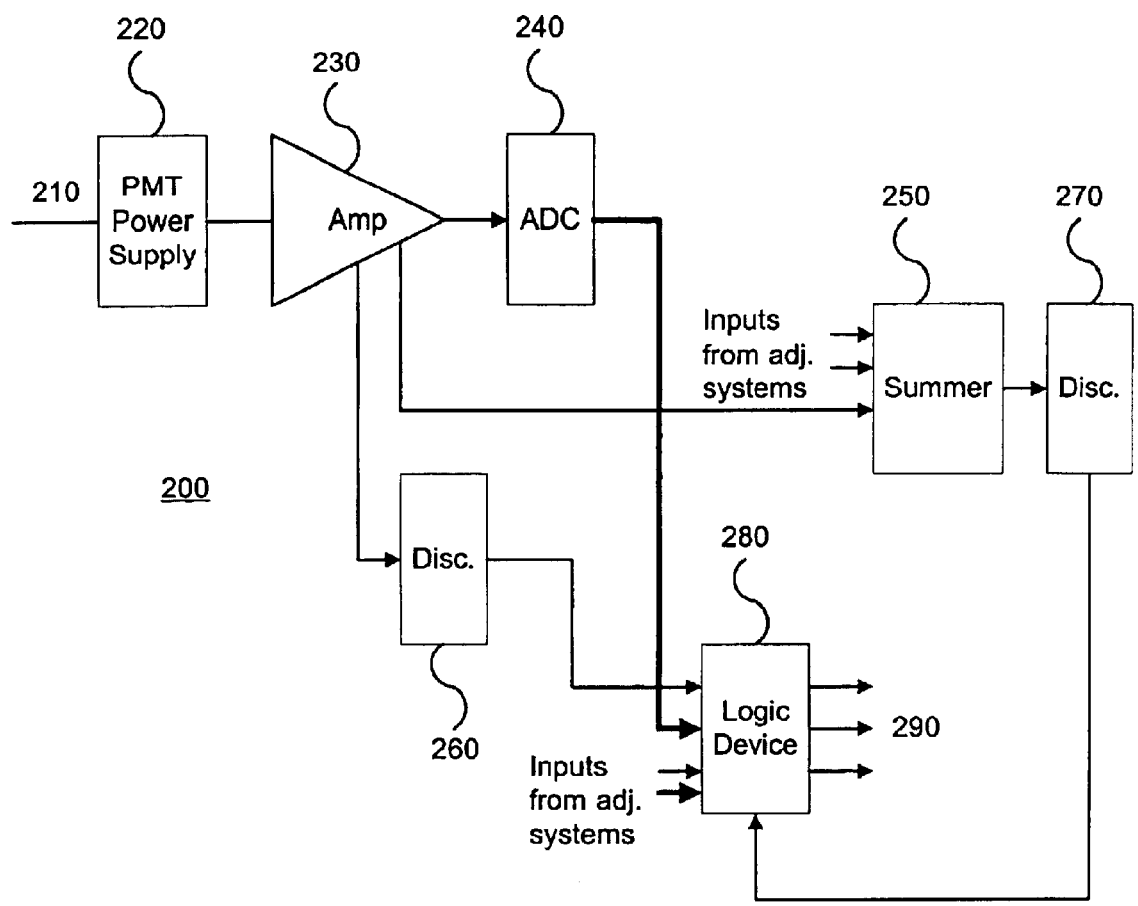
FIG. 2 is a block diagram of a triggering system according to the present invention.

FIG. 2 illustrates a block diagram for a triggering system according to the present invention. The triggering system 200 will be described in relation to the above-described embodiment for clarity, however, those skilled in the art will recognize many equivalent variations that achieve the same functional objectives. Referring to FIG. 2, signal 210 is the light emitted from the interaction of the gamma ray and the medium (e.g., scintillation of the liquid xenon). The photo-detectors (e.g., photo-multiplier (PMT)/power supplies) 220 detect the light signal 210. The photo-multiplier (PMT)/power supplies 220 convert the light signal 210 into an electrical signal, which is fed to amplifier 230. The amplified signal from amplifier 230 is fed to ADC 240, analog summer 250 and discriminator 260. The analog summer 250 also receives inputs from adjacent photodetectors. The output of the analog summer 250 is fed to another discriminator 270. The ADC 240 output, and signals from discriminators 260, 270 are sent to the logic device 280. The logic device 280 then sends output signals 290 to generate open or closed signals for the appropriate region of the shutter system. Additionally, logic device. 280 receives signals from other triggering systems that are used to in the determination of the appropriate region of the shutter system to activate (e.g., using the distribution, time of arrival or both, as described above). Those skilled in the art will appreciate that many variations to the specific triggering system 200 described above are readily recognizable. For example, after the analog to digital conversion, the digital signal can be supplied to a application specific integrated circuit (ASIC), programmable gate array (PGA), general purpose processor, and the like that determine the appropriate shutters to activate. Further, the above-described triggering system is merely a simplified block diagram of such a system, a more detailed description of such systems is provided in Bryman et al, *Gated Grid System Used with a Time Projection Chamber*, Nuc. Instr. Meth. In Physics Res. A234, pgs. 42–46, (1985) which is hereby incorporated by reference in its entirety.

The intrinsic resolution of the position sensitive detector depends on the readout electronics (time resolution) for the z coordinate (drift) direction and on the segmentation and readout method for the horizontal x-y direction in addition to such effects as diffusion and signal amplitude. The intrinsic timing resolution requirements indicated above may easily be met since the light signal from liquid noble material detectors is known to be fast (typically 1 ns), as compared to the relatively slow drift time (e.g., 0.2 cm/$\mu$s). Further, diffusion effects are known to be small. If poorer position resolution, say 1 cm were all that was required, the situation would be simplified by a reduction in the number of readout channels required or localization using only the light signal. Sub-millimeter resolution could be achieved by appropriate segmentation and would be primarily limited by effects of diffusion.

The efficiency of the detector is determined by the thickness of the active ionization layer. For example, for 511 keV gamma rays, 10 cm of liquid Xe results in approximately 95% efficiency of conversion.

Additionally, those skilled in the art will appreciate that methods for determining the position of a gamma ray interaction are disclosed from the foregoing description. An exemplary method for determining the position of a gamma ray interaction comprises emitting light in a medium in response to an interaction between a gamma ray and the medium. A plurality of photodetectors is used to determine when the light has been emitted from the medium and a first (i.e., rough) three-dimensional position of the interaction. A drift field is produced in the medium that directs ionization electrons resulting from the interaction to a collector. Finally, a second (i.e., precise) three-dimensional position of the interaction is determined by localizing the position of the interaction in two dimensions in the collector based on a position of the ionization electrons collected in the collector and determining a third dimension based on a time of arrival of the ionization electrons relative to when the light is detected. As described above, a portion of a shutter system is opened that corresponds to the interaction. Those skilled in the art will appreciate that the portion is defined by the projection of the position of interaction P in the x-y plane of the collector as shown in FIGS. 1A and 1B, for example. The shutter selectively blocks and permits the passage of the ionization electrons to the collector. Also, since a first three-dimensional position is determined, the time of arrival of the ionization electrons at the collector can also be roughly determined, thereby allowing for opening the shutter system only when the ionization electrons are expected. Thus, a distance from the collector to the interaction is determined based on an elapsed time from when the light is detected to when the light arrives at the collector.

The choice of materials and dimensions used can be determined to be different for each application. Converter and detector materials other than liquid or gaseous xenon or krypton can be used. Alternatives to the position sensitive detectors described above, can include any type of signal collector (including ones with gas gain, for example), ionization devices including multi-wire proportional detectors (with individual wire readout, cathode strip or pad readout and delay-line readout, for example), micro-strip or micro-gap chambers, time-projection-chambers, and the like. Further, any type of photodetector such as photo-multiplier, position-sensitive photomultiplier, photodiode, avalanche photodiode, hybrid photodiode, visible light photodetectors (e.g., VLPC), and the like can be used to provide the position sensitive trigger information.

Figure 3:
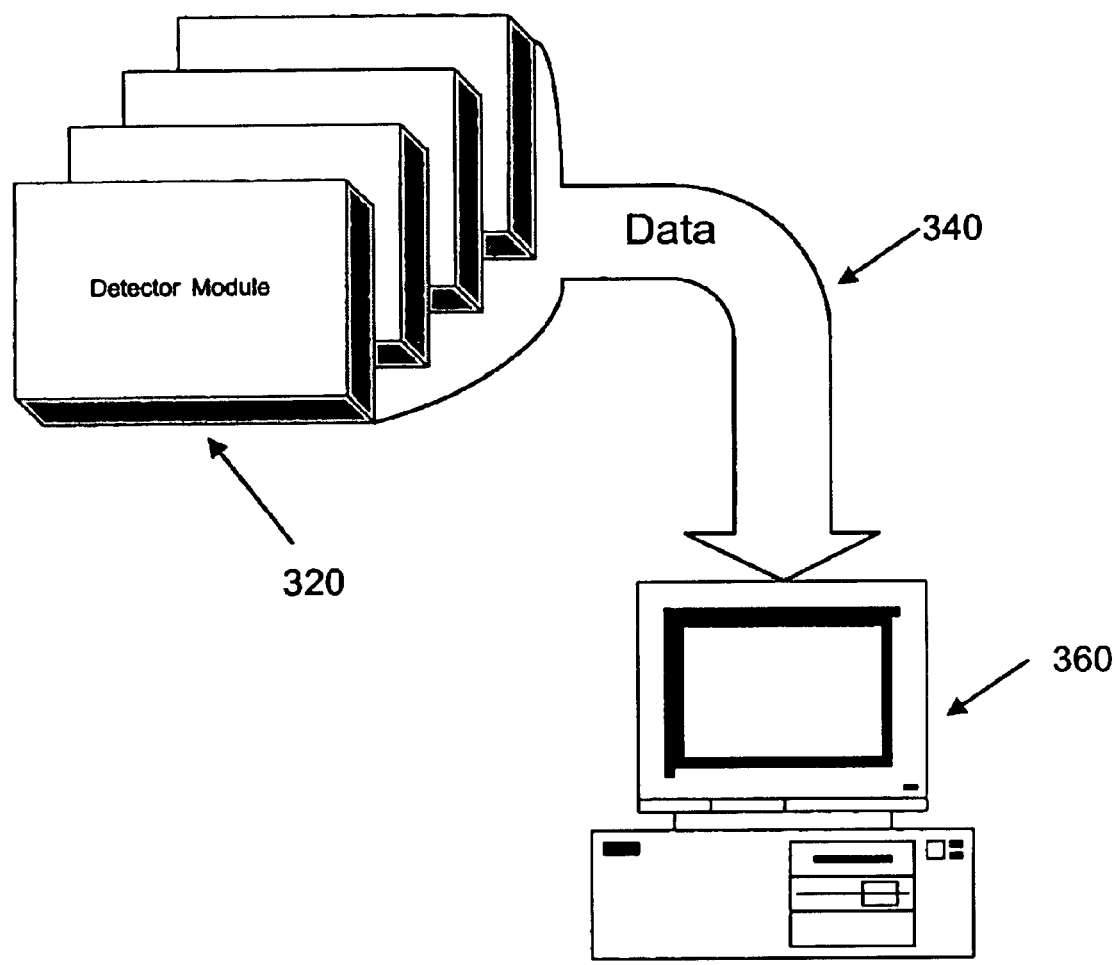
FIG. 3 is a block diagram of a system according to another embodiment of the present invention.

Additionally, as shown in FIG. 3, the system can be structured to operate in an off-line mode. In this particular arrangement, the use of the shutter system is not required. Therefore, manufacturing costs and complexity of the individual of the detector modules 320 could be reduced. However, a processor 360 is used to perform the necessary calculations on the data 340 from the module 320 to determine the precise three-dimensional location of the interaction of the gamma rays with the medium. Those skilled in the art will appreciate that without the shutter system in the amount of erroneous data collected by the collector is greatly increased. Therefore, the data collected from the plurality of photodetectors and the collector is processed off-line to determine the precise location in three dimensions of the interaction which was detected by the photodetectors.

The off-line processing includes filtering operations and other calculations to mathematically remove the extraneous data collected by the collector. Those skilled in the art will appreciate that using data from the photodetectors a window can be determined that contains the position and time of arrival at the collector of the desired signal (i.e., the ionization electrons generated from the interaction). Then, this window can be refined using conventional signal processing techniques to determine the precise position (i.e., x and y position) and time of arrival at the collector, as will be appreciated by those skilled in the art. The third dimension (i.e., the z position) is then determined using the difference between the time the interaction was detected by the photodetectors and the time of arrival at the collector and the drift velocity of the ionization electrons in the medium, in a conventional manner.

Further, as shown in FIG. 3, data can be collected from multiple detectors 320 and processed in one common processor 360. Still further, those skilled in the art will appreciate that the processor can be any device suitable to perform the processing of the data as described above. For example, the processor 360 can be a general-purpose computer, an application specific device, hardware/software integrated into an imaging system, and the like.

Accordingly, the foregoing detailed description merely illustrates the principles of the invention. It will thus be appreciated that those skilled in the art will be able to devise various arrangements which, although not explicitly described or shown herein, embody the principles of the invention and are thus within its spirit and scope. Therefore, the scope of the invention is not limited by the foregoing description but is defined solely by the appended claims.

What is claimed is:

1. A method for determining a position of a gamma ray interaction, the method comprising:

emitting light in a medium in response to an interaction between a gamma ray and the medium;

determining a first multi-dimensional position of the interaction using a plurality of photodetectors; and producing a drift field in the medium to direct ionization electrons resulting from the interaction to determine a second multi-dimensional position of the interaction based on a position of the ionization electrons.

2. The method of claim 1, wherein the drift field directs ionization electrons resulting from the interaction to a collector and wherein the second multi-dimensional position of the interaction is determined by localizing the position of the interaction in two dimensions in the collector.

3. The method of claim 1, wherein a third multi-dimensional position is determined based on a time of arrival of the ionization electrons relative to when light has been emitted from the medium.

4. The method of claim 3, further comprising:

opening a portion of an electronic shutter system that corresponds to an approximate position of the interaction and an approximate time of arrival of the ionization electrons, wherein the shutter system selectively blocks and permits the passage of the ionization electrons to the collector.

5. The method according to claim 4, wherein the portion of the shutter system is opened based on an expected time of arrival of the ionization electrons at the collector.

6. The method according to claim 1, wherein the medium is a liquid.

7. The method according to claim 6, wherein the medium is at least one of liquid xenon (Xe), liquid krypton (Kr) and liquid argon (Ar).

8. The method according to claim 1, wherein the medium is a noble gas.

9. The method according to claim 1, wherein the collector comprises a two-dimensional collection electrode array.

10. The method according to claim 1, wherein the drift field is established to provide a constant velocity in the medium.

11. The method according to claim 10, wherein the medium is liquid xenon and the drift field set to 1 kV/cm causing the ionization electrons to drift at a speed of 0.2 cm/$\mu$s.

12. The method according to claim 1, wherein the photodetectors include at least one of photo-multiplier tubes, position sensitive photo multipliers, photodiodes, avalanche photodiodes, hybrid photodiodes, visible light photodetectors, and any position sensitive photo-detectors.

13. The method of claim 1, further comprising:

collecting data from the plurality of photodetectors and a collector; and processing the data off-line to determine the second multi-dimensional position of the interaction.

14. The method according to claim 1, wherein a distribution of light emitted from the medium and detected by the plurality of photodetectors is used to determine the first multi-dimensional position.

15. The method according to claim 1, wherein a difference of times at which light emitted from the medium arrives at the plurality of photodetectors is used to determine the first multi-dimensional position.

16. The method according to claim 1, wherein a distribution of light emitted from the medium and detected by the plurality of photodetectors and a difference of times at which the light arrives at the plurality of photodetectors are used to determine the first multi-dimensional position.

17. An apparatus for determining a position of gamma ray interaction, comprising:
   a region containing a medium, the medium being adapted to emit both ionization electrons and light in response to an interaction between a gamma ray and the medium;
   a plurality of photodetectors, adapted to determine a first multi-dimensional position of the interaction;
   a collector, adapted to determine a second multi-dimensional position of the interaction by localizing the position of the interaction in two dimensions in the collector based on a position of the ionization electrons collected in the collector; and
   a plurality of field wires, adapted to produce a drift field in the medium that directs ionization electrons to the collector.

18. The apparatus of claim 17, wherein the plurality of photodetectors are adapted to detect emitted light, and wherein the collector is adapted to detect a third multi-dimensional position of the interaction based on a time of arrival of the ionization electrons relative to when the emitted light is detected.

19. The apparatus according to claim 18, further comprising:
   a shutter system that selectively blocks and permits the passage of ionization electrons to the collector, wherein a portion of the shutter system corresponding to an approximate position of the interaction in two dimensions and an approximate time of arrival of the ionization corresponding to the third dimension is opened to allow the ionization electrons to pass to the collector; and
   a triggering system that determines the portion of the shutter system that is opened and a time period that the shutter is opened based on light signals detected by the plurality of the photodetectors.

20. The apparatus according to claim 18, further comprising:
   a processor that collects data from the plurality of photodetectors and the collector and processes the data off-line to determine the second multi-dimensional position of the interaction.

21. The apparatus according to claim 17, wherein the medium is a liquid.

22. The apparatus according to claim 17, wherein the medium is at least one of liquid xenon (Xe), liquid krypton (Kr) and liquid argon (Ar).

23. The gamma ray detector according to claim 17, wherein the medium is a noble gas.

24. The apparatus according to claim 17, wherein the drift field is established to provide a constant velocity in the medium.

25. The apparatus according to claim 24, wherein the medium is liquid xenon and the drift field set to 1 kV/cm causing the ionization electrons to drift at a speed of 0.2 cm/$\mu$s.

26. The apparatus according to claim 17, wherein the photodetectors include at least one of photo-multiplier tubes, position sensitive photo multipliers, photodiodes, avalanche photodiodes, hybrid photodiodes, visible light photodetectors, and any position sensitive photo-detectors.

27. The apparatus according to claim 17, wherein the collector comprises a two-dimensional collection electrode array that localizes the position of the interaction in the two dimensions.

28. The apparatus according to claim 17, wherein a distribution of light emitted from the medium and detected by the plurality of photodetectors is used to determine the first multi-dimensional position.

29. The apparatus according to claim 17, wherein a difference of times at which light emitted from the medium arrives at the plurality of photodetectors is used to determine the first multi-dimensional position.

30. The apparatus according to claim 17, wherein a distribution of light emitted from the medium and detected by the plurality of photodetectors and a difference of times at which the light arrives at the plurality of photodetectors are used to determine the first multi-dimensional position.

31. An apparatus for determining a position of a gamma ray interaction, the apparatus comprising:
   means for emitting light in a medium in response to an interaction between a gamma ray and the medium;
   means for determining a first multi-dimensional position of the interaction from a detected distribution of light emitted from the medium; and
   means for producing a drift field in the medium to direct ionization electrons resulting from the interaction from which a second multi-dimensional position of the interaction is determinable based on a position of the ionization electrons.

32. The apparatus of claim 31, further comprising:
   means for collecting electrons resulting from the interaction, wherein the drift field directs ionization electrons resulting from the interaction to the means for collecting and wherein the second multi-dimensional position of the interaction is determined by localizing the position of the interaction in two dimensions in the means for collecting.

33. The apparatus of claim 32, further comprising:
   means for determining a third multi-dimensional position based on a time of arrival of the ionization electrons relative to when light has been emitted from the medium.

34. The apparatus of claim 31, further comprising:
   means for determining a third multi-dimensional position based on a time of arrival of the ionization electrons relative to when light has been emitted from the medium.

35. An apparatus for determining a position of a gamma ray interaction, the apparatus comprising:
   means for emitting light in a medium in response to an interaction between a gamma ray and the medium;
   means for determining a first multi-dimensional position of the interaction from a difference of times at which light emitted from the medium arrives at a plurality of photodetectors; and
   means for producing a drift field in the medium to direct ionization electrons resulting from the interaction from which a second multi-dimensional position of the interaction is determinable based on a position of the ionization electrons.

36. The apparatus of claim 35, further comprising:
   means for collecting electrons resulting from the interaction, wherein the drift field directs ionization electrons resulting from the interaction to the means for collecting and wherein the second multi-dimensional position of the interaction is determined by localizing the position of the interaction in two dimensions in the means for collecting.

37. The apparatus of claim 36, further comprising:

means for determining a third multi-dimensional position based on a time of arrival of the ionization electrons relative to when light has been emitted from the medium.

38. The apparatus of claim 35, further comprising:

means for determining a third multi-dimensional position based on a time of arrival of the ionization electrons relative to when light has been emitted from the medium.

39. An apparatus for determining a position of a gamma ray interaction, the apparatus comprising:

means for emitting light in a medium in response to an interaction between a gamma ray and the medium;

means for determining a first multi-dimensional position of the interaction from a difference of times at which light emitted from the medium arrives at a plurality of photodetectors and from a distribution of light emitted from the medium and detected by the plurality of photodetectors; and means for producing a drift field in the medium to direct ionization electrons resulting from the interaction from which a second multi-dimensional position of the interaction is determinable based on a position of the ionization electrons.

40. The apparatus of claim 39, further comprising:

means for collecting electrons resulting from the interaction, wherein the drift field directs ionization electrons resulting from the interaction to the means for collecting and wherein the second multi-dimensional position of the interaction is determined by localizing the position of the interaction in two dimensions in the means for collecting.

41. The apparatus of claim 40, further comprising:

means for determining a third multi-dimensional position based on a time of arrival of the ionization electrons relative to when light has been emitted from the medium.

42. The apparatus of claim 39, further comprising:

means for determining a third multi-dimensional position based on a time of arrival of the ionization electrons relative to when light has been emitted from the medium.

43. A method for determining a position of a gamma ray interaction, the method comprising:

determining a first multi-dimensional position of the interaction from a distribution of light emitted from the medium, in response to an interaction between a gamma ray and the medium, and detected by a plurality of photodetectors; and determining a second multi-dimensional position of the interaction from a position of ionization electrons resulting from the interaction, directed from a drift field produced in the medium.

44. A method for determining a position of a gamma ray interaction, the method comprising:

determining a first multi-dimensional position of the interaction from a difference of times at which light emitted from the medium, in response to an interaction between a gamma ray and the medium, arrives at a plurality of photodetectors; and determining a second multi-dimensional position of the interaction from a position of ionization electrons resulting from the interaction, directed from a drift field produced in the medium.

45. A method for determining a position of a gamma ray interaction, the method comprising:

determining a first multi-dimensional position of the interaction from a distribution of light emitted from the medium in response to an interaction between a gamma ray and the medium and detected by a plurality of photodetectors, and from a difference of times at which the light arrives at the plurality of photodetectors; and determining a second multi-dimensional position of the interaction from a position of ionization electrons resulting from the interaction, directed from a drift field produced in the medium.

* * * * *